United States Patent [19]
Stevens et al.

[11] Patent Number: 5,558,232
[45] Date of Patent: Sep. 24, 1996

[54] APPARATUS FOR SORTING DOCUMENTS

[75] Inventors: Albert F. Stevens, Moorestown; Jeffrey L. Chodack, Mullica Hill; Russell M. Lange, Palmyra; Robert R. Dewitt, Marlton, all of N.J.; John D. Coleman, Philadelphia, Pa.; Peter W. Bressler, Philadelphia, Pa.; Keith W. Forsyth, Philadelphia, Pa.

[73] Assignee: Opex Corporation, Moorestown, N.J.

[21] Appl. No.: 177,846

[22] Filed: Jan. 5, 1994

[51] Int. Cl.⁶ .............................. B07C 5/00; G06K 9/00
[52] U.S. Cl. ........................ 209/584; 209/630; 209/900; 209/939; 209/942; 345/156
[58] Field of Search .................... 209/577, 583, 209/584, 587, 629, 630, 657, 705, 900, 939, 942; 345/156; 382/7, 57

[56] References Cited

U.S. PATENT DOCUMENTS

| Re. 32,328 | 1/1987 | Russell . | |
| D. 317,089 | 5/1991 | Coleman et al. . | |
| 4,205,780 | 6/1980 | Burns et al. . | |
| 4,387,639 | 6/1983 | Brown et al. . | |
| 4,510,619 | 4/1985 | LeBrun et al. . | |
| 4,722,444 | 2/1988 | Murphy et al. | 209/583 |
| 4,863,037 | 9/1989 | Stevens et al. | 209/900 X |
| 4,891,088 | 1/1990 | Svyatsky | 209/900 X |
| 4,913,295 | 4/1990 | Murphy et al. | 209/583 |
| 4,921,107 | 5/1990 | Hofer | 209/900 X |
| 4,985,842 | 1/1991 | Ward | 209/584 X |
| 5,063,599 | 11/1991 | Concannon et al. | 250/352 X |
| 5,134,834 | 8/1992 | Hayduchok . | |
| 5,204,811 | 4/1993 | Bednar et al. . | |
| 5,208,869 | 5/1993 | Holt . | |
| 5,293,431 | 3/1994 | Hayduchok et al. . | |
| 5,310,062 | 5/1994 | Stevens et al. | 209/577 X |

FOREIGN PATENT DOCUMENTS

| 258895 | 8/1988 | Germany | 209/584 |
| 319180 | 12/1988 | Japan | 209/584 |

*Primary Examiner*—William E. Terrell
*Assistant Examiner*—Tuan Nguyen
*Attorney, Agent, or Firm*—Dann, Dorfman, Herrell and Skillman, P.C.

[57] ABSTRACT

An apparatus and method for sorting documents is provided. A document transport on the apparatus conveys documents along a selected path of movement from an input bin to a series of output bins. An optical scanner, such as a video camera, is positioned along the selected path to capture images of the documents. The captured images are displayed on a display monitor to permit an operator to inspect portions of the documents for a desired characteristic. The operator activates a push button on a selector switch depending on the presence of the desired characteristic. Bins are provided for stacking and separating documents having the desired characteristic from those documents lacking the desired characteristic. Gates are provided for directing the documents to the appropriate output bin.

28 Claims, 8 Drawing Sheets

APPARATUS FOR SORTING DOCUMENTS

FIELD OF THE INVENTION

The present invention generally relates to an apparatus and method for sorting documents and, more specifically, to an apparatus and method for acquiring images of documents and displaying those images to an operator to permit sorting of the documents in a selected manner in reference to manual input from the operator.

BACKGROUND OF THE INVENTION

Many companies have a need for sorting large quantities of incoming mail. For instance, utility companies, phone companies and credit card companies receive millions of envelopes from their customers on a daily basis. The majority of these envelopes contain an invoice stub and some type of customer payment, usually in the form of a bank check or money order. The processing of the customer payments is often dependent on information provided by the customer on the invoice stubs. In practice, some customers pay the full amount of the invoices while other customers make partial payments. Sorting of the customer payments is thereby necessitated to facilitate future billing. Additionally, many invoice stubs include some type of check-off box to enable the customer to provide predetermined information to the company. For example, a customer may mark one check-off box to indicate a change of address or mark another box to request information from the company. In certain applications, it may be desirable to provide further sorting of the customer mail based on the information provided by the check-off boxes.

Due to the large quantity of mail received by various companies, there has long been a need for efficient sorting of the incoming mail into selected groups based on various criteria. For example, downstream processing of invoices and payments is more efficient when full payments are separated from partial payments. Sorting provides efficiencies because full payments can often be power-encoded, whereas partial payments generally require hand keying. Furthermore, a separate grouping of documents that require additional attention, such as the entry of a customer's new address, may also be preferred.

Many companies attempt to sort documents simultaneously during the process in which the documents are extracted from their envelopes. Typically, an operator of a document extractor pulls documents out of a pre-slit envelope, inspects the documents, and then places the documents in desired groupings. Since the operator must perform multiple operations, e.g., document extraction, document orientation and document inspection, before finally making a decision about which group the documents belong, the operator's performance and overall throughput tend to be inefficient.

Another approach to sorting documents entails breaking up the process into two separate operations. During a first operation, the documents to be processed are extracted from their envelopes and are then oriented in a selected manner. The extraction and orientation of the documents may either be done manually or be done automatically using a high-speed extractor. Either way, a second operation must then be effected to separate the documents into desired groupings.

Manual separation is a laborious and time-consuming process. However, in many applications, manual sorting is necessary, especially when sorting requires human decision-making. In attempts to improve efficiency, there have been several automated machines developed to reduce the amount of manual sorting. Unfortunately, the automated approach to sorting documents may not be cost effective or desirable in all applications. For example, most checks accompanying invoice stubs are handwritten. As such, even the most advanced automated equipment may not be capable of reading with a desired degree of accuracy the handwritten dollar amounts entered by many customers. Additionally, many of the notes made by customers on the invoices require decision-making that an automated machine may not be capable of performing.

In accordance with the present invention, an apparatus and method are provided to enable the efficient sorting of documents. The use of the document sorter, in accordance with the present invention, permits efficient operator input with automated techniques.

SUMMARY OF THE INVENTION

In accordance with the present invention, an apparatus and method for sorting documents are provided. A document transport is provided on the apparatus for conveying the documents along a selected path of movement. Typically, the documents are conveyed along a work surface of the apparatus.

A viewing area is positioned along the selected path for presenting each of the documents to an operator. At the viewing area, the operator may effect visual detection of documents having a desired characteristic.

A selector is provided to permit activation by the operator upon visual detection of documents having the desired characteristic. The selector may be in the form of a hand-held control, may include actuator buttons on the work surface of the apparatus, or may be activated by the voice of the operator.

A gate for directing documents is provided along the selected path of movement. The gate is responsive to the activation of the selector by the operator to direct documents having the desired characteristic to a first selected output area. The gate also functions to direct documents lacking the desired characteristic to a second select output area.

In more specific operation, the document sorter includes a document transport for conveying mated pairs of documents, such as an invoice stub and a check, along a selected path of movement. Typically, the document transport conveys the documents from a document input bin to selected output areas, such as storage bins. The document sorter includes an optical scanner positioned along the selected path of movement for capturing an image of the mated pair of documents. The optical scanner may be in the form of a camera properly positionable along the path of movement to capture images from a selected side or sides of the mated pairs of documents. As an alternative, the optical scanner may include multiple cameras for imaging the fronts and/or backs of the documents.

A display monitor is also provided for displaying the captured images of the documents to enable at least selected portions of the documents to be visually inspected by an operator. For example, the display monitor may effect the simultaneous display of the information from an amount box on the invoice stub and the information from the amount box on the customer check. In addition, a viewing area is provided along the path of movement for temporarily holding the sorted pair of documents while the operator is inspecting the images displayed on the monitor. The viewing area also permits the operator to inspect the actual documents, if required.

A selector having actuator buttons is provided to enable operator input to the sorter. After determining into which group a pair of documents should be sorted, the operator designates that group by activating the appropriate selector button. An override button is provided to permit the operator to cancel or alter the original group designation for a pair of documents. When the override button is activated, the operator may designate a new group for the pair of documents by actuating the proper selector button. For applications involving two-group sorting, the documents may be automatically re-designated to a new group when the override button is activated.

A stacker having a number of output bins is provided for stacking pairs of documents into the designated groups. Documents are directed to the appropriate output bin by path diverting gates positioned along the path of movement.

BRIEF DESCRIPTION OF THE DRAWINGS

The following summary as well as the following detailed description of the preferred embodiments of the present invention will be better understood when read in conjunction with the appended drawings, in which.

DETAILED DESCRIPTION OF THE PREFERRED EMBODIMENTS

Figure 1:
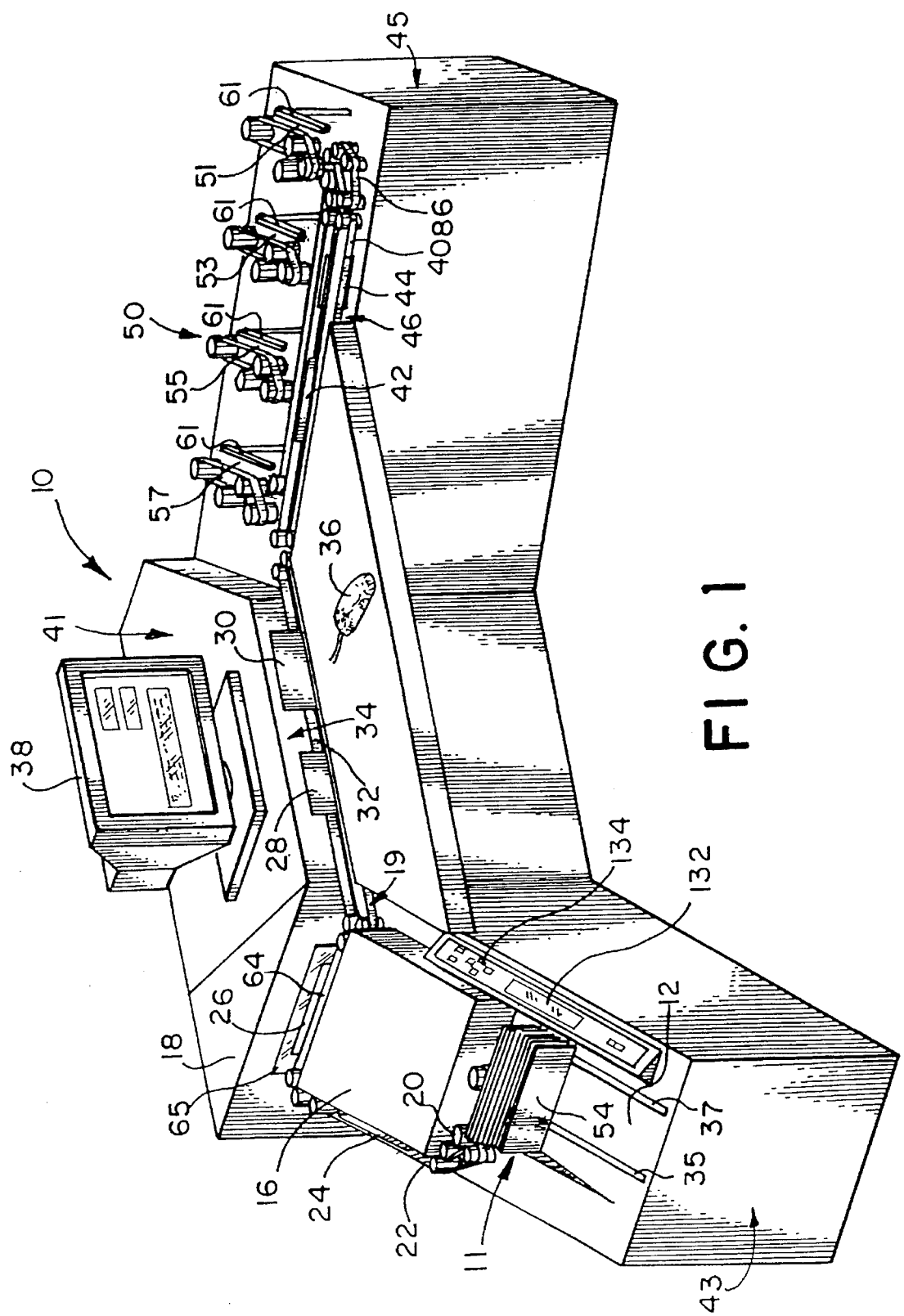
FIG. 1 is a schematic perspective view of the document sorter having some of its covers removed to reveal internal operating mechanisms of the document sorter.
Figure 2:
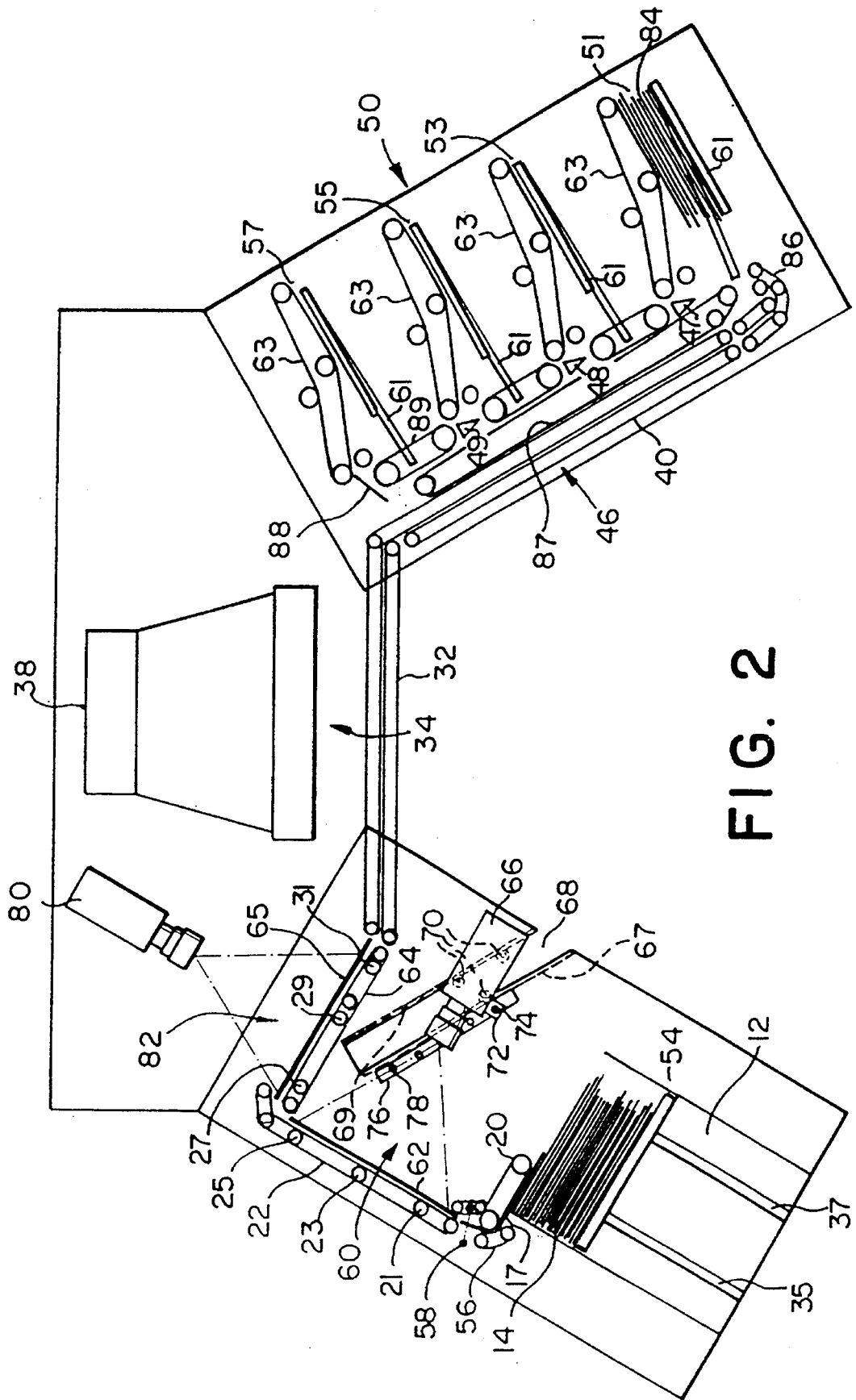
FIG. 2 is a top plan view of the document sorter having some of its covers and its front shelf removed to reveal internal operating mechanisms of the document sorter.

As illustrated in FIGS. 1 and 2, a document sorter, generally designated 10, is provided for sorting documents, and, particularly, mated pairs of documents, into predetermined groups. The document sorter 10 provides a work station for an operator so that manual control input may be effected by the operator to control operation of the sorter. The document sorter provides a desk-level or counter-level work surface so that the operator may be comfortably seated at the work station during extended operation of the sorter.

As shown in FIG. 1, the sorter includes a central section 41 having a desk top for supporting a display monitor 38 generally at eye level of a seated operator and a knee hole underneath to permit the operator to draw closer to the monitor 38. The sorter also includes left and right return sections, 43 and 45 respectively, providing counter-height work surfaces generally within arms length of the seated operator. A document feeder 11, having a document input bin 12, is provided at the work surface of the left return 43. Documents 14 to be sorted by the document sorter 10 are loaded by the operator into the document input bin 12.

A document transport, generally designated 19, conveys the documents along a selected path of movement generally along the work surface of the document sorter. More specifically, the document transport 19 functions to convey the documents from the input bin 12 on the left return 43 along the central section 41 of the sorter to an output area in the form of a document stacker 50 located at the work surface of the right return 45. Upon start-up, the documents are fed out of the input bin 12, one at a time, by feeder belt 20. Thereafter, several belt drives, designated as 22, 64, 32, and 40, cooperate to transport the documents along the selected path of movement.

From the document feeder 11, each document is conveyed to predetermined areas along the path of movement where selected images of the front and/or the back of each document may be captured. Images are acquired using AC genlocked CCTV cameras having an RS-170 interface. Exiting the feeder 11, each document is conveyed by belt drive 22 to front imaging area 60. If acquisition of the front image of that document is required, the front camera 66 is activated to acquire the necessary image. After the front camera 66 captures the image of the front of the document, the front image is transferred from the front camera 66 and temporarily stored in image memory 160. Upon completion of image acquisition by the front camera 66, the belt drives 22 and 64 cooperate to convey the document to a back imaging area 82 located on the work surface of the left return 43. If required, the back camera 80 takes an image of the back of the document and this back image is also transferred to image memory 160.

Figure 3:
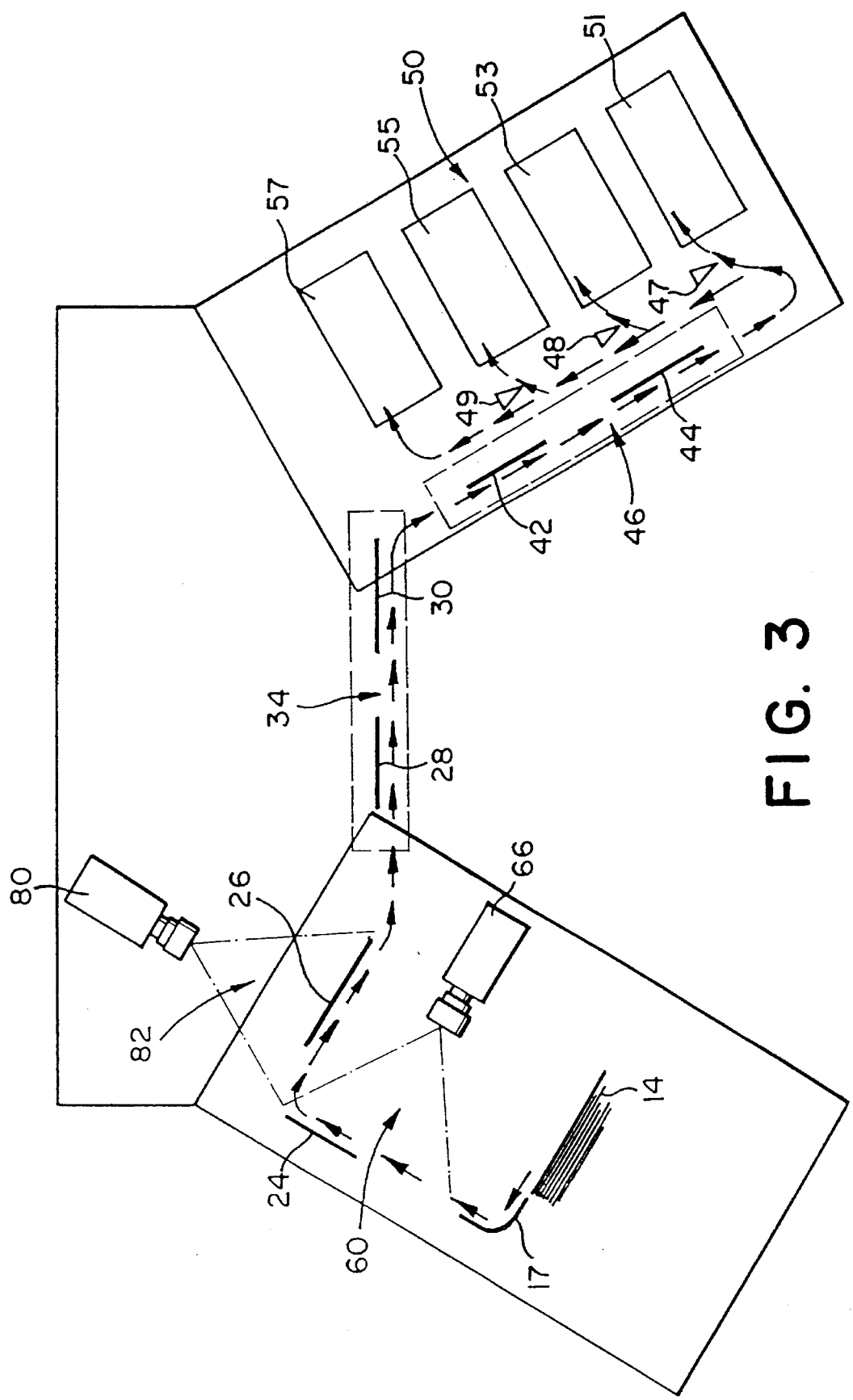
FIG. 3 is a top schematic plan view showing the flow path of documents through the document sorter.

The imaging process is repeated for each document fed into the paper path. As best shown in FIG. 3, the front imaging area 60 and the back imaging area 82 are spaced a predetermined distance along the paths of movement so that an image of the front of a document 24 located in front imaging area 60 and an image of the back of a document 26 located in back imaging area 82 can be simultaneously acquired. For mated pairs of documents, the same type of document from each pair is desirably oriented in the stack of documents to lead its corresponding document from the pair along the path of movement. For example, during processing of invoices and corresponding checks, the invoice from each pair may be selected to lead its corresponding check so that account information from the invoice can be recorded in advance of information from the corresponding check. Accordingly, as the front image from the invoice is captured at front image area 60, the corresponding check remains in a pre-feed position 17. After the image of the front of the invoice is recorded, the document transport incrementally moves the documents so that the invoice is positioned in the back imaging area 82 and the corresponding check is positioned in the front imaging area 60. The next succeeding invoice is also incrementally moved to the pre-feed position 17.

The ordering of documents in the document sorter 10 and the current location for each document is tracked by the sorter control system. This is important during the imaging process because image acquisition may depend, in part, on the type of document being imaged. For example, it may be necessary to image the front and back of an invoice in certain applications but only necessary to image the front of a corresponding check. Consequently, the sorter must track the position of each type of document along the path of movement to ensure proper image acquisition.

Figure 10:
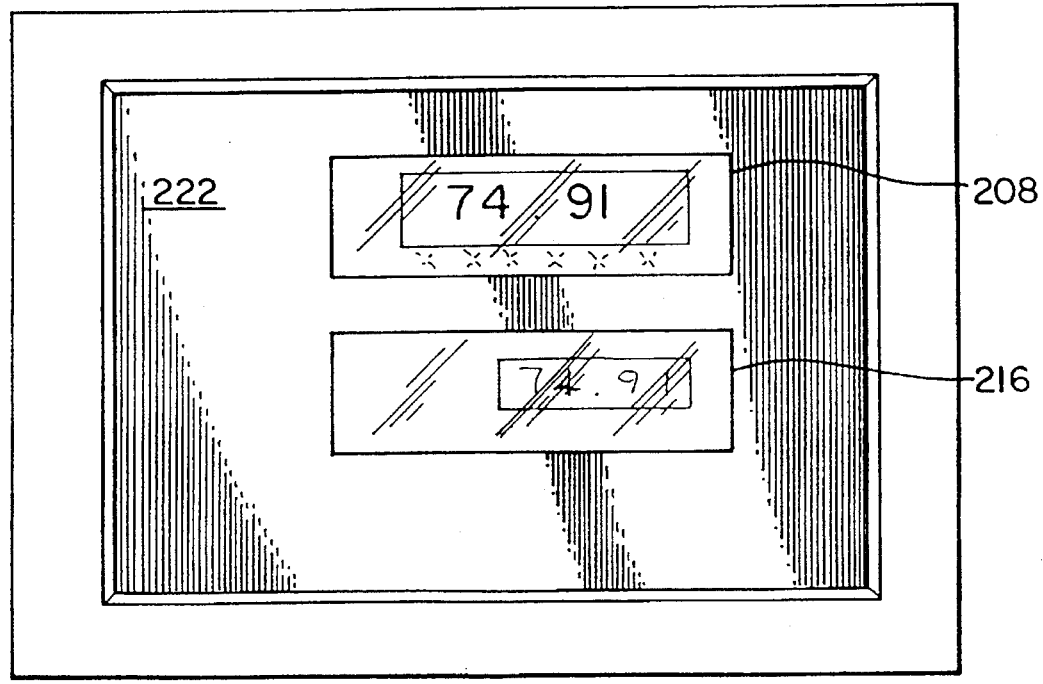
FIG. 10 is a sample display showing an enlarged display of selected portions of the invoice stub and the check shown in FIG. 9, specifically an enlarged display of the area where the dollar amount on each of the documents is located.

After being positioned in the back image area 82, each document is then transported by cooperating movement of belt drives 64 and 32 to a viewing area 34 located on the work surface of the central section 41 of the sorter. Either full images of the pair of documents or images of selected portions of the pair of documents are displayed on video monitor 38. Images of documents may be arranged on the display monitor 38 to facilitate fast recognition of the pertinent areas of the documents and to minimize eye movement which could lead to premature operator fatigue. For example, as illustrated in FIG. 10, enlarged images of the amount due box 208 of an invoice 205 and the courtesy box 216 of a check 206 are closely spaced to enable an operator to easily and efficiently inspect the images of the documents, now in the viewing area 34, without having to physically handle individual documents.

While inspecting the selected portions of the pair of documents on the video monitor 38, the operator must then decide into which group that pair of documents belongs, e.g. full payments, partial payments or other established groups. If for some reason the operator is unable to decipher or read the displayed images of the document pair on the monitor, the operator may inspect the actual documents positioned in the viewing area 34 located generally beneath the monitor. The operator then activates one of the push buttons 92, 94, 96, 98, and 100 on input switch 36 to designate a grouping category for the pair of documents.

Upon activation of a push button, the pair of documents is conveyed by the belt drives 32 and 40 from the viewing area 34 to a staging area 46 located on the working surface of the right return 45. The staging area 46 is spaced a predetermined distance from the viewing area 34 along the path of movement. Movement of the belt drives 32 and 40 is properly coordinated so that the pair of documents in the viewing area 34 is incrementally moved and then paused at the staging area 46. At the same time, the next pair of documents, which had been respectively positioned in the front imaging area 60 and the back imaging area 82, is moved into viewing area 34 and selected images of that document pair are displayed on the video monitor 38.

At this point, the operator will usually be able to decide into which group to place this next pair of documents currently located in the viewing area In some cases the operator will have inadvertently made an incorrect group designation for the pair of documents now located in the staging area 46. Usually, the operator will realize the mistake prior to making the group designation for the next pair of documents now located in the viewing area 34. To correct such a mistake, the operator can activate one of the push buttons on the input switch 36, which functions as an override button. For instance, push button 100 may be designated as the override button. If the override button 100 is activated, the original group designation for the document pair now located in the staging area 46 is canceled. The sorter may then automatically channel the pair of documents in the staging area 46 to a selected output area. Alternatively, the sorter may function to permit the entry of a new group designation on the input switch 36 for the documents in the staging area 46 and interpret the next succeeding entry as the designation for the pair of documents in the viewing area 34.

If the override button is not activated, the pair of documents located in staging area 46 is then transported, upon operator activation of the input switch 36 for designation of the documents in the viewing area 34, to the stacker 50 located at the working surface of the right return 45. Upon entering the stacker 50, the pair of documents is directed to one of four output bins 51, 53, 55, and 57. One of the gates 47, 48, and 49 is fired to direct the pair of documents to the appropriate output bin determined by the designation entered at the input switch 36 for that pair of documents.

Considering the operation of the sorter in greater detail, the input bin 12 is recessed into the working surface of the left return 43. An inclined surface is provided at the bottom of the bin to facilitate gravity feed of the documents into the sorter. Two tracks 35 and 37 are provided along the bottom of the bin to serve as guides for a document pusher 54 to slide within the input bin 12. The pusher 54 includes a set of roller bearings that ride in each of the tracks 35 and 37 to facilitate movement of the pusher in a direction down the inclined surface of the bin. As the pusher 54 slides down the inclined surface, the pusher exerts a force on the back of the document stack which tends to push the documents against the feed belt 20.

When initially loading documents, the operator first moves the pusher 54 away from feeder belt 20. The operator then loads the bin 12 with the desired batch of documents 14. After loading the documents into the bin 12, the pusher 54 is adjusted toward feeder belt 20 to effect contact with the stack of documents 14. Preferably, the stack of documents 14 should be positioned in the bin so that the side edges of the documents are justified against a side wall of the input bin 12, as shown in FIG. 2.

The bottom of input bin 12 is angled slightly downward towards the feeder belt 20. As a result, the documents 14 loaded in input bin 12 appear to be slightly shingled. Due to the downward angle of the bin 12 and the roller bearings of the pusher 54 riding in tracks 35 and 37, gravity causes the pusher 54 to exert a constant pressure on the stack of documents 14. As a result, documents are continually supplied from the document stack 14 into the sorter at feeder belt 20.

At the appropriate time, movement of feeder belt 20 is activated and the next document in input bin 12 is pre-fed to a pre-feed position 17 as shown in FIG. 3. Actuation of a selected button on the input switch 36 causes the first document of a document pair to be moved from the pre-feed position 17 to the front imaging area 60 where document movement is momentarily paused to enable an image to be taken of the first document in the front imaging area. After imaging of the first document is effected at the front imaging area 60, the feeder belt 60 and cooperating main transport belts 22 and 64 are automatically activated by the sorter to transport the first document to the back imaging area 82 and to transport the second document of the pair from the pre-feed position 17 to the front imaging area 60. Movement of the documents is paused until the actuation of a selected button of the input switch.

A stepper motor 142, engaged with feeder belt 20, is used to accurately regulate the feeding of documents from the input bin 12. The actuation of the stepper motor 142 for a pre-determined number of steps translates into fixed travel distances of documents. Therefore, document positioning can be precisely controlled.

Referring to FIG. 2, a sensor 58, such as an optical infrared sensor, is provided along the path of movement intermediate feed belt 20 and belt drive 22 to detect the arrival of a leading edge of the document at the pre-feed position 17. At the time the lead edge of a document is detected by sensor 58, the stepper motor 142 controlling the movement of feeder belt 20 is deactivated. The net effect is the precise positioning of a pre-fed document 17 having its leading edge located just past the sensor 58.

A second stepper motor 146 is engaged with belt drives 22, 64, 32, and 40 to precisely control the movement of documents along the main transport path. The belt drives 22, 64, 32, and 40 of the main document transport are interconnected and, as such, operate in synchronism to move all documents positioned along the main document transport. The simultaneous movement of all documents in the transport permits the pitch between documents to remain constant. In addition, the distance between each document position 17, 24, 26, 28, 30, 42, and 44, as shown in FIG. 3, remains the same. Since the feed stepper motor 142 and main transport stepper motor 146 turn on at approximately the same time, the leading edge of each document conveyed through the document transport stops at the same location in each of the document positions.

A proper handoff between the feeder 11, served by feed belt 20, and the main document transport, served by belt drives 22, 64, 32, and 40, is required to prevent tearing and crunching of documents. Coordinated movement is effected by simultaneously turning on the feed stepper motor 142 controlling feeder belt 20 and the main transport stepper motor 146 controlling the main document transport. During document handoff, both stepper motors are set so that the feeder belt 20 and the main document transport 19 are running at the same speed, resulting in a smooth transfer of documents from the document feeder to the main transport.

The positions of documents are tracked during the handoff operation by counting the number of steps of travel by feed stepper motor 142 and transport stepper motor 146. After the documents travel a selected distance from the pre-feed location 17 and into a tight nip of main transport section 22, the speed of the main transport 19 may be increased to enhance the overall throughput of the document sorter 10. Since the main transport section 22 has a firm hold of the documents at the nip, the increased speed of main transport section 22 translates into increased speed of document travel. To avoid tearing of the documents, a one-way clutch is integrated into document feeder 11. The one-way clutch permits feeder belt 20 to travel at the increased speed of main transport section 22.

After the transfer of documents from feeder belt 20 to main transport section 22 is completed, the speed of feeder belt 20 automatically returns to the speed of feeder stepper motor 142. Additionally, the feeder stepper motor 142 remains activated until the next document in the input bin 12 advances to the pre-feed location 17.

Once a document enters the main transport section, the drive belt 22 advances the document to position 24 at the front imaging area 60. The lead edge of the document at position 24 properly aligns within the right edge view of front camera 66, as shown in FIG. 3.

When the document stops at position 24, the front camera 66 acquires an image of the document, if required. As best shown in FIG. 2, a front imaging plate 62, made out of glass, permits the front camera 66 to view the entire document without obstruction by transport belts. Foam rollers 21, 23, and 25 are provided to press the document 24 against the front imaging plate 62. The foam rollers assist in positioning the entire document within a preselected depth of view over the entire length of the document, thus permitting the front camera 66 to acquire a sharp, focused image.

Front camera 66 can be adjusted to provide a desired view of the document such as an enlarged view. For this purpose, a guide slot 68 is provided at the work surface of the left return 43 to permit the front camera 66 to be moved closer to the document to provide an enlarged view and further away from the document to provide a greater area of image acquisition. The slot 68 is angled relative to the direction of movement of the document in the front imaging area so that the right edge view of the front camera 66 may be aligned with the leading edge of the document at position 24. The front camera 66 is mounted on a camera mounting block 72 that moves along the guide slot 68. The underside of the mounting block 72 includes three roller bearings 70, shown in phantom in FIG. 2, that ride in grooves 67 and 69 on opposite sides of the guide slot 68, allowing the front camera 66 to be easily positioned at a desired distance relative to document position 24. In addition, a locator bar 76 is provided along a side edge of the guide slot 68 to permit the camera 66 to be held in position at precise, selected locations along the guide slot 68. For this purpose, the locator bar 76 includes a number of anchor holes 78 located at the selected locations along the guide slot 68. A spring-loaded locator pin 74 is mounted to the mounting block 72 for removable insertion into a selected anchor hole 78 to thereby lock the front camera 66 in a fixed position. The pin 74 may be removed from an anchor hole against the spring bias of the pin 74 to enable the camera to be moved to another selected location corresponding to the position of another anchor hole 78.

After the front camera 66 acquires an image of the document 24 at the front imaging area 60, the next pre-fed document 17 is advanced to position 24 and the document currently at position 24 is advanced to position 26 at the back imaging area 82. Document 26 is positioned within the back imaging area so that its lead edge is aligned within the left view of the back camera 80. As shown in FIG. 2, the back camera 80 may be mounted in a fixed position to permit imaging of the entire back surface of a document. Alternatively, a guide slot, similar to slot 68, may be provided to allow adjustment of the back camera 80 to enable the acquisition of an enlarged view of the back of the document at position 26. Similar to front imaging 60, back imaging area 82 includes foam rollers 27, 29, and 31 and a back imaging plate 65, made out of glass, to allow acquisition of a sharp, focused image.

As shown in FIG. 2, foam rollers 21, 23, and 25 engage the back of the document in the front imaging area 60 to transport the document through the front imaging area 60 while providing an unobstructed view of the front of the document at the front imaging area for the front camera 66. The foam rollers 21, 23, and 25 pinch the document against imaging plate 62 to move the document at the front imaging area. The belt of belt drive 22 fits into a recess in each of the foam rollers and acts to guide documents along the document path of the first imaging area 60. Foam rollers 27, 29, and 31 and belt drive 64 are positioned on the opposite side of the document in the back imaging area 82 so that the foam rollers 27, 29, and 31 engage the front of the document in order to transport the document through the back imaging area 82 while providing an unobstructed view of the back surface of the document for the back camera 80 at the back imaging area 82. The foam rollers 27, 29, and 31 pinch the document against imaging plate 65 to move the document through the back imaging area 82. The belt of belt drive 64 is located within a recess in each of the foam rollers 27, 29, and 31 to guide documents along the document path of the back imaging area 82.

Upon completion of image acquisition by the front camera 66 and the back camera 80, the main document transport 19 is again activated and all documents in the transport path are advanced to the next incremental position in the path. As best shown in FIG. 3, the document at position 26 in the back imaging area 82 moves to position 28 in the viewing area 34, the document at position 24 in the front imaging area moves to position 26 in the back imaging area 82, and the document at pre-fed position 17 moves to position 24. At this point, the back of the document now positioned at 26 may be imaged by back camera 80 and the front of the document now positioned at location 24 may imaged by front camera 66.

Again, upon completion of image acquisition by the front camera 66 and the back camera 80, all documents in the transport path are advanced to the next incremental position so that one pair of documents is located at position 28 and 30 in viewing area 34, and another pair of documents is located in front imaging area 60 and back imaging area 82. Selected portions of the documents now positioned at locations 28 and 30 in the viewing area 34 are displayed on the display monitor 38. The operator inspects the images displayed on video monitor 38 and activates one of the buttons on the input switch 36 to designate a selected document grouping.

Figure 4:
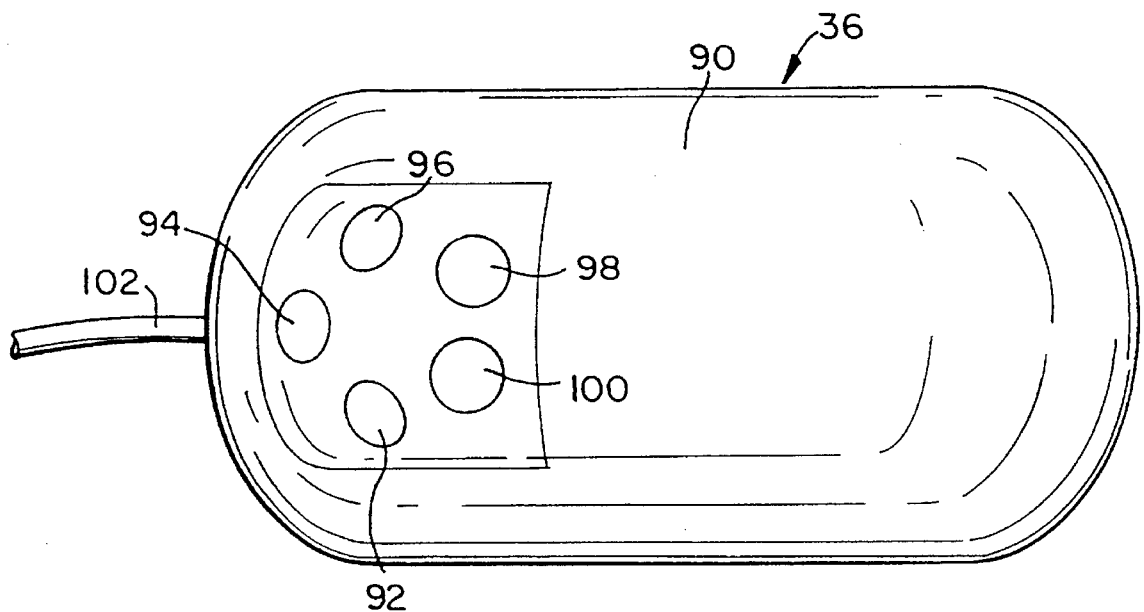
FIG. 4 is a top plan view of a selector switch for the document sorter.
Figure 5:
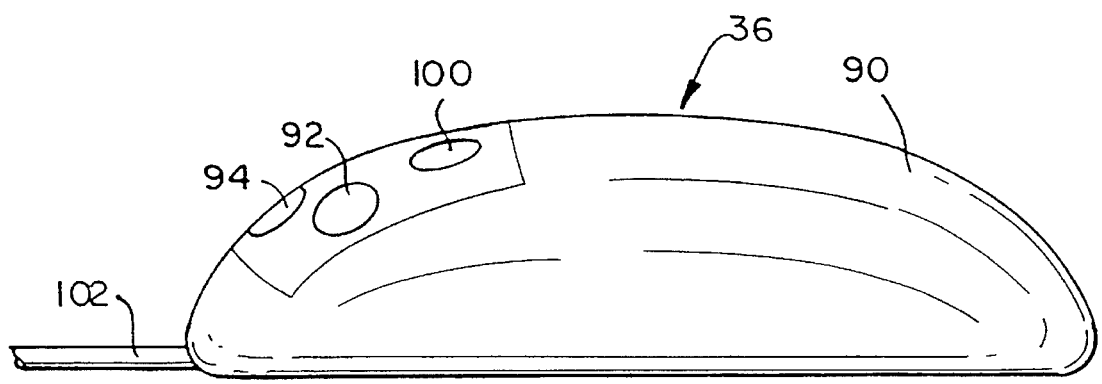
FIG. 5 is a side elevational view of the selector switch.

As shown in FIGS. 4 and 5, the input switch 56 includes five buttons 92, 94, 96, 98, and 100. The operation of each button may differ, depending on the pre-programmed function assigned to each button. Generally, at least one, and as many as four, buttons are designated as selector buttons. One button is generally designated as an override button. In one mode of operation, buttons 92 and 94 function as selector buttons and button 100 functions as an override button. In this mode, the operator's right hand is placed on hand rest 90, with the operator's index finger positioned over button 92 and the operator's middle finger positioned over button 94. The operator can easily activate button 92 to sort full payment documents and can activate button 94 to sort partial payment documents. Button 100 serves as the override button allowing the operator to correct mistakes in group designations.

The intended goal of the input switch design is to reduce operator fatigue. The input switch 36 includes a base having a convex outer surface of sufficient size allowing the operator to comfortably rest the operator's hand and wrist on top of the outer surface of the base. Additionally, the surface of the input switch 36 is contoured to comfortably fit within the operator's grasp. The operator can then easily actuate the push buttons located on the outer surface of the base of the input switch 36. Also part of the input switch 36 is an output port for producing an output signal to the control system of the document sorter 10. The output port responds to the actuation status of the push buttons located on the input switch.

As an alternative to using a five button input switch, other types of selectors may be used for activation by an operator to designate a selected document grouping. For example, an input switch with a different number of buttons, optical reflective sensors, optical beam sensors and foot pedals may each be used. In addition, an operator's voice or other sound may be used to designate a selected document grouping. Furthermore, a combination of selectors may be utilized. For instance, an input switch having two buttons may be used to designate selected document grouping and voice-activation may be implemented for the override function.

Prior to pushing a selector button and assigning a group designation to the pair of documents located in viewing area 34, the operator may, instead, push the override button 100. Activation of the override button 100 cancels the group designation for the pair of documents at positions 42 and 44 in the staging area 46.

The method of assigning a new group designation to the pair of documents at positions 42 and 44 in the staging area depends on the override mode selected. In one override mode, the previous image of the documents positioned at locations 42 and 44 may be re-displayed on the video monitor 38, allowing the operator to correct the group designation for that pair of documents by activating the appropriate selector button. In an alternate override mode, the activation of the override button 100 may automatically designate the document pair to an alternate group. The mode of automatically designating an alternate group is practical when documents are sorted into only two groups. If the operator designates an incorrect group, activation of the override button automatically alters the group designation to the other, correct group.

If the operator does not push the override button 100 while the pair of documents is positioned in the staging area 46, but instead makes a group selection for the pair of documents in viewing area 34, the documents in the staging area 46 will be advanced to the stacker 50. The stacker 50 includes a stacker transport including belt drives 86, 87, and 89 that conveys the documents from the main transport to the appropriate output bins. Unlike the feeder and main document transport, an AC motor drives the stacker transport. While the document sorter is in operation, the stacker transport runs continuously. The speed of stacker transport is matched to the speed of the main document transport so that a smooth hand-off is achieved when documents move from the main document transport to the stacker 50.

The stacker 50 includes gates 47, 48 and 49 for directing documents that enter the stacker into one of four bins, designated as 51, 53, 55 and 57. A deflector 88 is included to guide documents into destination bin 57. Although four bins are shown, a lesser or greater number of bins may be provided. For example, additional bins may be used to allow water-falling of documents between bins. In such a configuration, a particular group designation may be assigned to multiple bins so that when one designated bin is filled, stacking of additional documents for that group will automatically switch to a second bin in order to permit the operator to continue processing documents for longer periods without having to empty filled output bins.

An output bin transport 63 is provided for each output bin. The output bin transport 63 is in the form of a belt drive that moves documents into the respective output bin so that the leading edges of all the documents directed into such bin are justified against the back wall of the output bin. The output bin transport 63 cooperates with the stacker transport and, therefore, also runs continuously when the document sorter 10 is in operation. An output bin pusher 61 is also provided in each bin. The output bin pusher 61 is a spring-loaded arm mounted to one side of the output bin in position to bias against the stack of documents in the bin in order to maintain a neat stack of documents in the bin.

As described, the document sorter 10 is a stand alone work station permitting an operator to load input bin 12 with documents 14. After processing, documents are sorted into output bins 51, 53, 55, and 57. However, the document sorter 10 can be integrated with other document processing equipment. For example, a document extractor may feed documents directly into input bin 12. Alternatively, the document extractor may replace the document feeder 11 entirely so that documents are transported from the document extractor to main transport section 22. In other applications, some or all of the processed documents may be directed to output areas other than output bins 51, 53, 55, and 57. In such a configuration, a smaller number of output bins or no output bins may be needed. For instance, pairs of full-pay documents may be directed from staging area 46 to a power-encoder, pairs of partial-pay documents may be directed to a hand-keying station, and pairs of documents having a change of address request may be directed to an output bin or some other output area.

Figure 6:
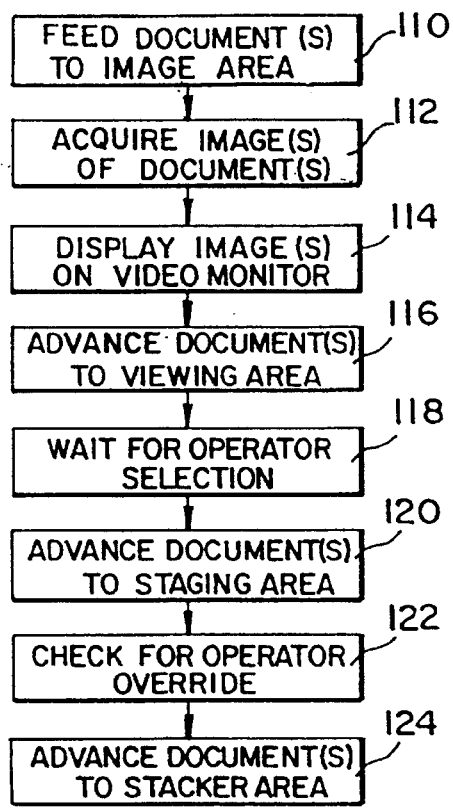
FIG. 6 is a flow chart showing the sequence of operations of the document sorter.

The processing flow of the system is illustrated in FIG. 6. At step 110, documents are fed into the imaging areas and at step 112 images of the documents are acquired. The feeding of documents to the image areas and the acquisition of images of the documents is a multi-step process. The exact imaging sequence is configurable and may vary depending on the type of documents being sorted. In one configuration, it may be necessary only to image the front side of each of a pair of documents. Accordingly, only front camera 66 would be activated. For customers that desire only front-side imaging, camera 80 can be excluded from the system. If only front-side imaging is required, each document of a pair will be successively stopped in the front imaging area 60 so that the front camera 66 can take an image of each of the documents.

Positioning the front camera 66 proximate document position 24 permits only a portion of the document to be imaged. In this configuration, the document at position 24 can be partially advanced within the front imaging area 60 by the document transport to enable the front camera 66 to take a second image of the same document.

In some configurations, a back side image of only one of the documents may be required. For instance, where pairs of documents include an invoice and a check an image of only the front side of the check may be needed. The invoice, however, may have an invoice amount on the front side and a change of address request on the back side. In this case, the invoice must be imaged on both sides.

After the required images of the documents are taken, portions of the required images are displayed on a video monitor 38 at step 114. Simultaneous with the image display, the pair of documents is advanced and stopped at the viewing area 34 at step 116. The system then continuously monitors input switch 36 at step 118, waiting for the operator to make a group designation by activating one of the push buttons 92, 94, 96, or 98. As soon as the system detects the activation of a push button, the document pair is advanced to the staging area 46 at step 120. While in the staging area, the operator has the opportunity to push the override button 100 on input switch 36. The activation of the override button is checked at step 122. If the override button is not activated, the documents in the staging area 46 are advanced to the stacker 50 at step 124.

If, however, the operator pushes the override button 100 before making the selection for the next pair of documents positioned in the viewing area 34, the system alters the group destination of the pair of documents positioned at the staging area 46.

In one particular mode of operation, the system may automatically re-assign the group designation. As an example, the system may be set up to sort documents into two groups. One group may be defined as a full payment group in which pairs of documents having equal invoice amounts and payments amounts are to be stacked in output bin 51. The second group may contain documents, having unequal invoice and payment amounts, that are to be stacked in output bin 53. The operator may select the first group by activating push button 92 and may select the second group by activating push button 94. As a result, activation of push button 92 directs full-pay pairs to output bin 51 and activation of push button 94 directs partial-pay pairs to output bin 53.

During the course of sorting documents, the operator may, for example, inadvertently activate push button 92 when the pair of documents is, in reality, a partial-pay. At this point, the pair of incorrectly designated documents will move into the staging area 46. The operator now has the opportunity to push override button 100 in order to change the bin destination of this pair of documents. In one configuration, activation of the override button 100 will switch the previous decision of the operator and the pair of documents initially designated to go to bin 51 will automatically be redirected to bin 53. In an alternative configuration, the system may be set so that the activation of the override button 100 will redirect the document pair to a reject bin, for example, bin 57.

In another mode of operation, activation of the override button may cause the system to re-display the images of the documents in the staging area on the monitor to enable the operator to enter a new designation. Following the entry of the new designation, the images of the documents in the viewing area 34 will be displayed. Upon activation of the selected push button, the documents in the viewing area 34 will be appropriately designated and moved to the staging area 46 while the documents in the staging area 46 will be directed to the bin corresponding to the new designation.

Figure 7:
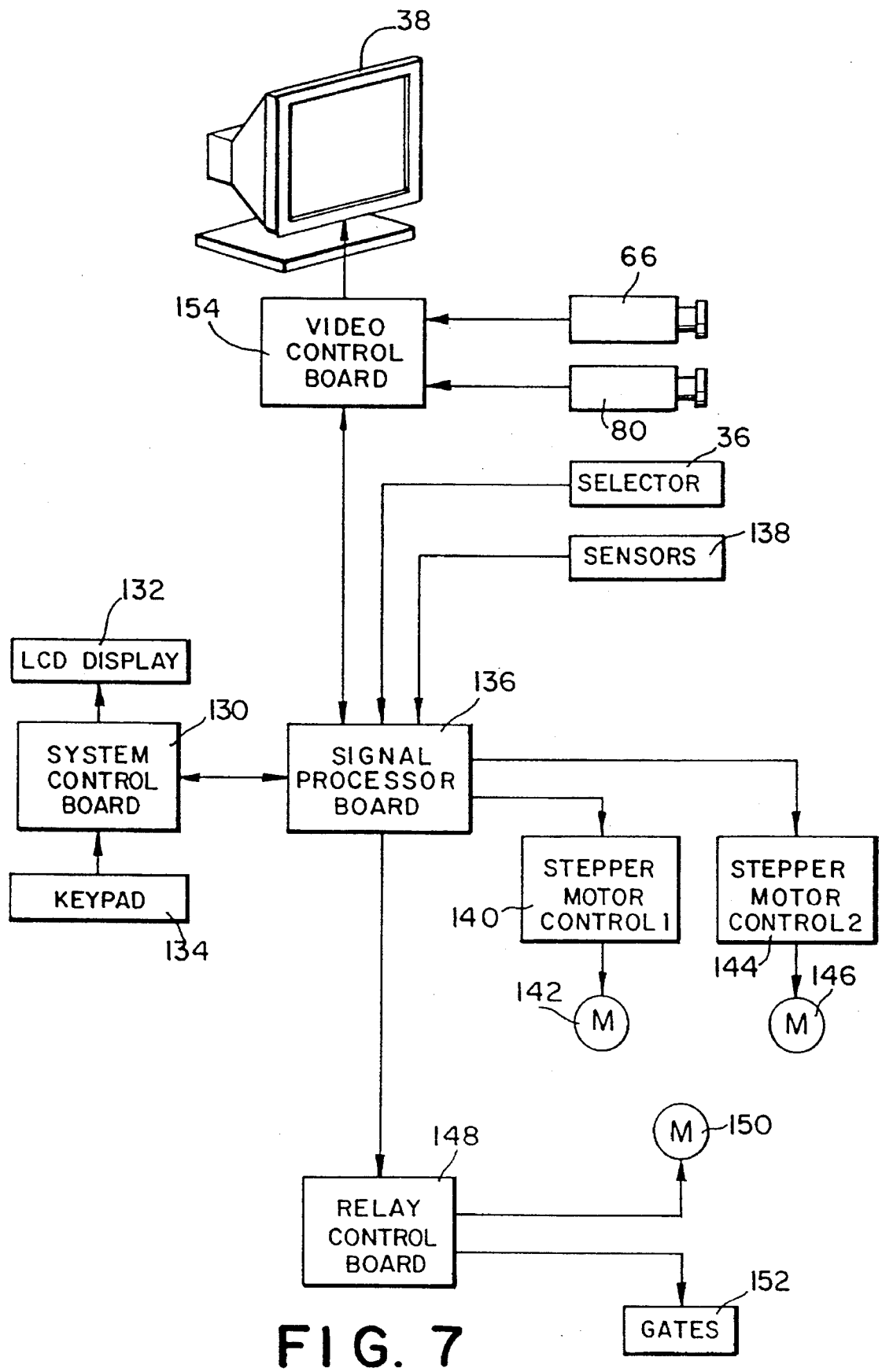
FIG. 7 is a block diagram of the electrical circuitry of the document sorter.

An electrical block diagram of the control system is shown in FIG. 7. A system control board 130 controls basic operations of the document sorter 10. A user interface is provided through an LCD display 132 and keypad 134. An operator may input commands, change machine and job parameters, and retrieve statistical information through keypad 134. Status of the system and input prompts may be displayed on LCD display 132.

Various output devices may be controlled by the system control board 130 through signal processor board 136, which isolates the system control board 130 from the rest of the system. Stepper motor control 140 controls the feeder stepper motor 142. Stepper motor control 144 is provided for controlling the main document transport stepper motor 146.

A relay control board 148, controlled by the system control board 130 through signal processor board 136 is used to activate the AC motor 150 which is used to drive the stacker transport. The relay control board 148 also controls gate operation 152 by controlling outputs to gates 47, 48, and 49.

The system control board 130 also monitors the status of the selector switch 36 and sensor operation 138 through signal processor board 136. A cable 102 between the input switch 36 and the signal processor board 136 includes five sensor lines for detecting whether one of the push buttons 92, 94, 96 and 98 or override button 100 has been activated by the operator.

The control system of the document sorter 10 includes a number of sensor inputs 138. Feeder sensor 58 is used to locate pre-fed documents and to control the transfer of documents between the feeder 11 and the main document transport 19. In addition, several other path sensors are located along the main transport path to detect the arrival and departure of documents. If a document does not arrive at a particular sensor at the appropriate time, a jam condition is declared and the operator is notified about the jam through LCD display 132. Bin full sensors are provided in each of the output bins 51, 53, 55 and 57 to alert the operator of a full bin condition. If multiple bins have been designated for a group, a bin full condition will cause the system to divert documents to an appropriately designated non-full bin. However, if all bins allocated to a particular group are filled, the control system halts processing of documents and prompts the operator to empty the full bins through the LCD display 132.

The video control board 154 controls acquisition of the images by cameras 66 and 80. The video control board 154 also controls the display of images on the video monitor 38.

The video controller board 154 communicates to the system controller board 130 via a serial communication channel at a rate of 9600 baud. The communication line between the video controller board 154 and system controller board 130 runs through signal processor 136. The video control board 154 receives commands from the system control board 130. For example, the video control board 154 may be directed to display a particular image or to have one of the cameras acquire an image of a document. The video control board 154 reports successful completion of a command to the system control board 130.

Figure 8:
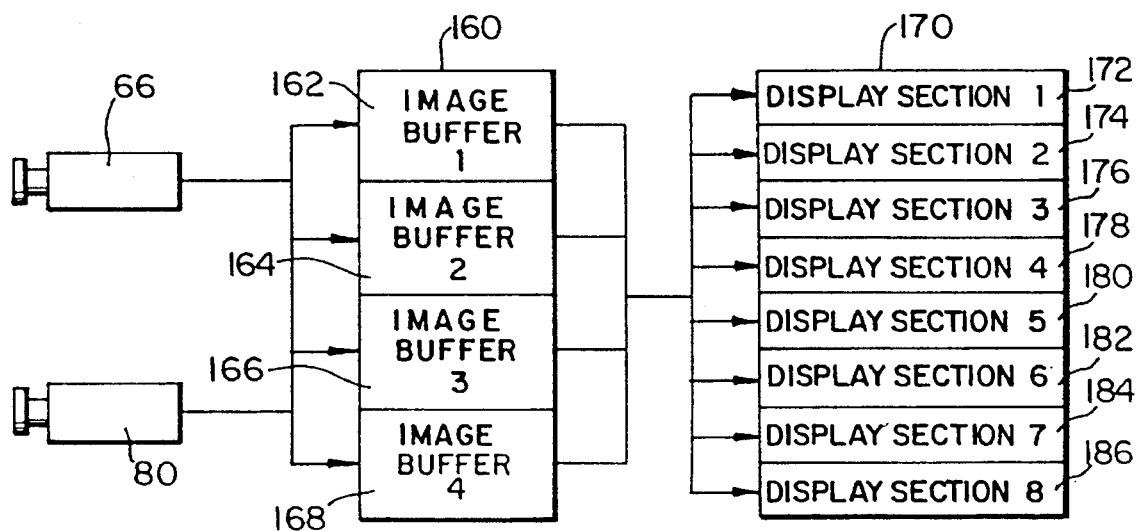
FIG. 8 is a block diagram of the memory structure used to store images of documents.

Referring to FIG. 8, the video control system includes four image buffers, generally designated 160, and a display buffer 170. The video control board 154 directs images acquired by the front camera 66 and the back camera 80 to one of four image buffers 162, 164, 166 or 168. For example, the front side of the first document acquired by the front camera 66 may be loaded into image buffer 162, the front side of the second document may be loaded into image buffer 164, and the back side of the first document may be loaded into image buffer 166, and image buffer 168 may be left unused. When commanded by the system control board 130, the video control board 154 loads portions of one or more image buffers 160 into one of eight display sections 172, 174, 176, 178, 180, 182, 184 and 186 of display buffer 170. By way of example, two portions of image buffer 1 (162) may be loaded into display section 1 (172) and display section 2 (174), respectively. In addition, a section of image buffer 2 (164) may be loaded into display section 3 (176) and a portion of image buffer 3 (166) may be loaded into display section 4 (178). Image buffers 160 are of a fixed length. Each image buffer 162, 164, 166, and 168 holds a full image acquired by front camera 66 and back camera 80 so that four full images may be stored simultaneously.

Display buffer 170 is a FIFO memory having a sufficient size to support a 640×480 monochrome VGA monitor. The eight display sections are logical divisions of the display buffer 170. Not all sections of display buffer 170 are required to be used and the physical size of each section is not fixed.

The configuration and use of the display buffer 170, as well as the operation of the document sorter, may be better understood by reference to FIGS. 9–12. In forming the display of FIG. 9, a full-size camera view 200 of the first side of the first document 205, such as an invoice, is displayed on the video monitor. The full-size view 200 matches the size of the image of the first document 205. Also shown on the video monitor is a second full-size camera view 202 in which only a portion of the full-size view 202 incorporates a full image of the front side of the second document 206, such as a check. The remaining portion of second image 202 is background 204, which in essence is the background area of the front imaging area 60.

Figure 9:
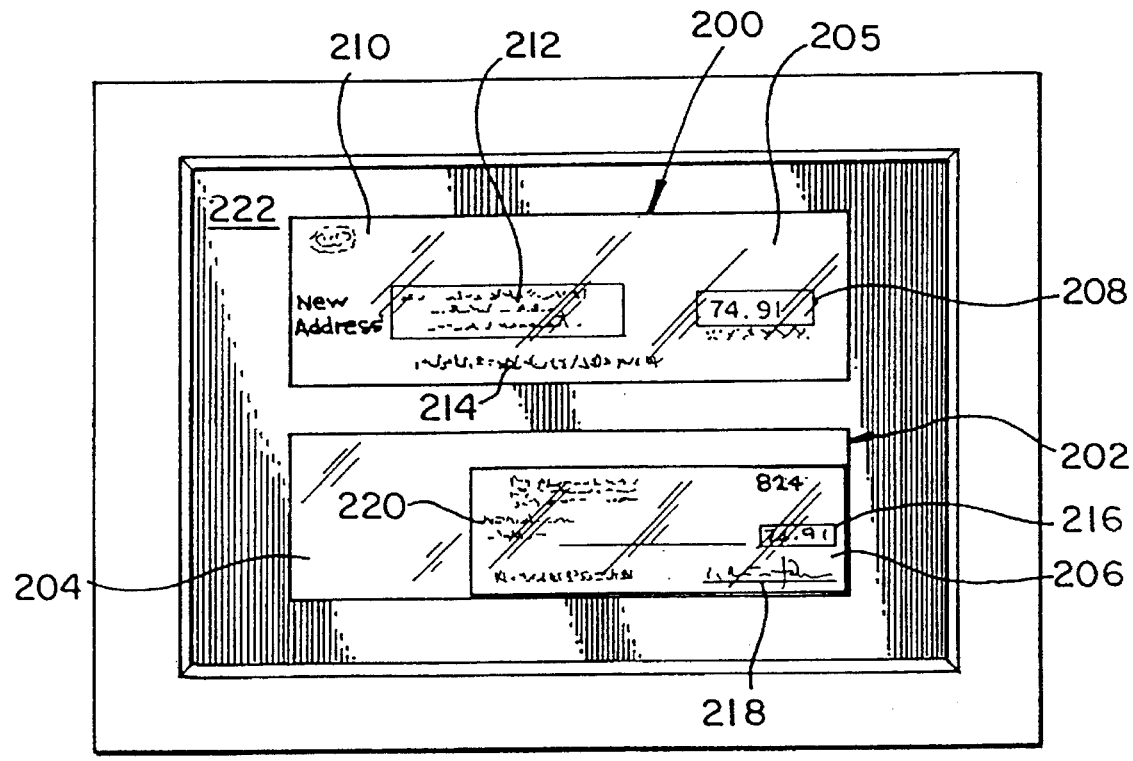
FIG. 9 is a sample display showing full images of the front sides of a mated pair of documents in the form of an invoice stub and a check.

To display the image shown in FIG. 9, the video control board 154 transfers an acquired front image of an invoice from front camera 66 to image buffer 1 (162). In addition, the video control board 154 transfers an acquired front image of a check from front camera 166 to image buffer 2 (164). Furthermore, after receiving a command from the system control board 130, the video control board 154 loads the entire contents of image buffer 1 (162) into display section 1 (172) at a location in display buffer 170 so that the full image of the first document appears on video monitor 38 as shown in FIG. 9. Likewise, the video control board 154 transfers the entire image buffer 2 (164) to display section 2 (174) resulting in a full display of image 202.

As shown in FIG. 9, the selection of display sections in the display buffer 170 are in a horizontal relationship to one another. Such a display configuration is the result of transferring images from image buffers 160 to the FIFO of display buffer 170. In addition, during this transfer, a grey level, specified by the system control board 130, is loaded in the FIFO to serve as a grey background 222 around the displayed images 200 and 202.

Figure 11:
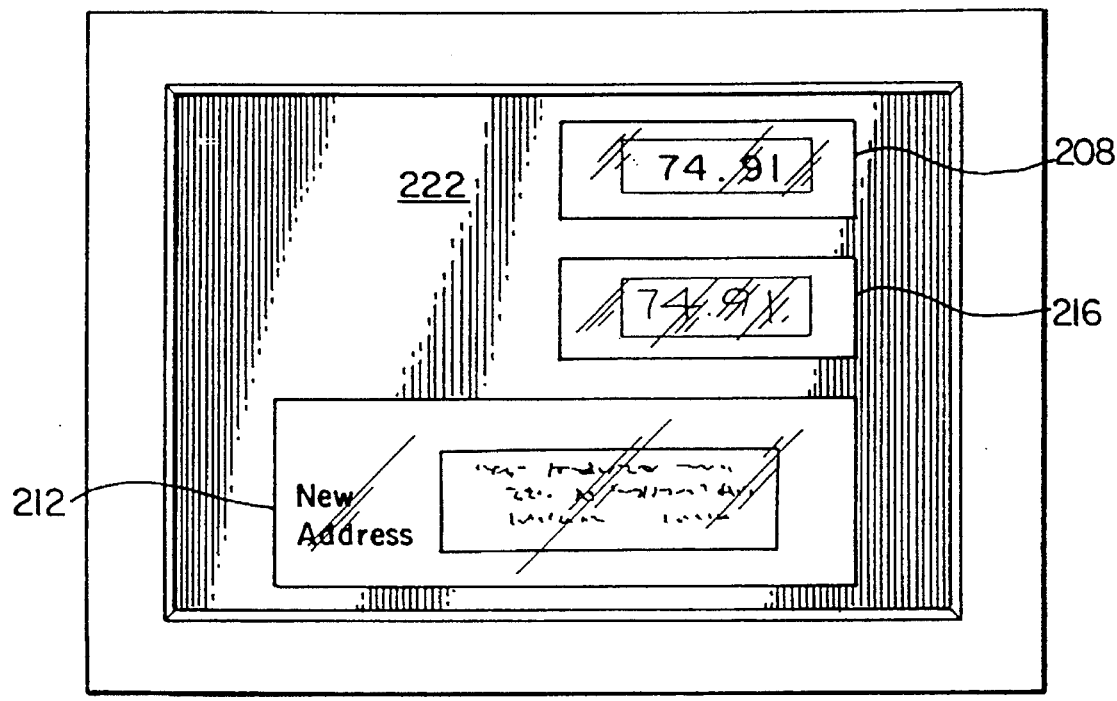
FIG. 11 is a sample display showing an enlarged display of selected portions of the invoice stub and the check shown in FIG. 9, and specifically an enlarged display of the areas where the dollar amount on each of the documents is located and where the change of address area appears on the invoice stub.
Figure 12:
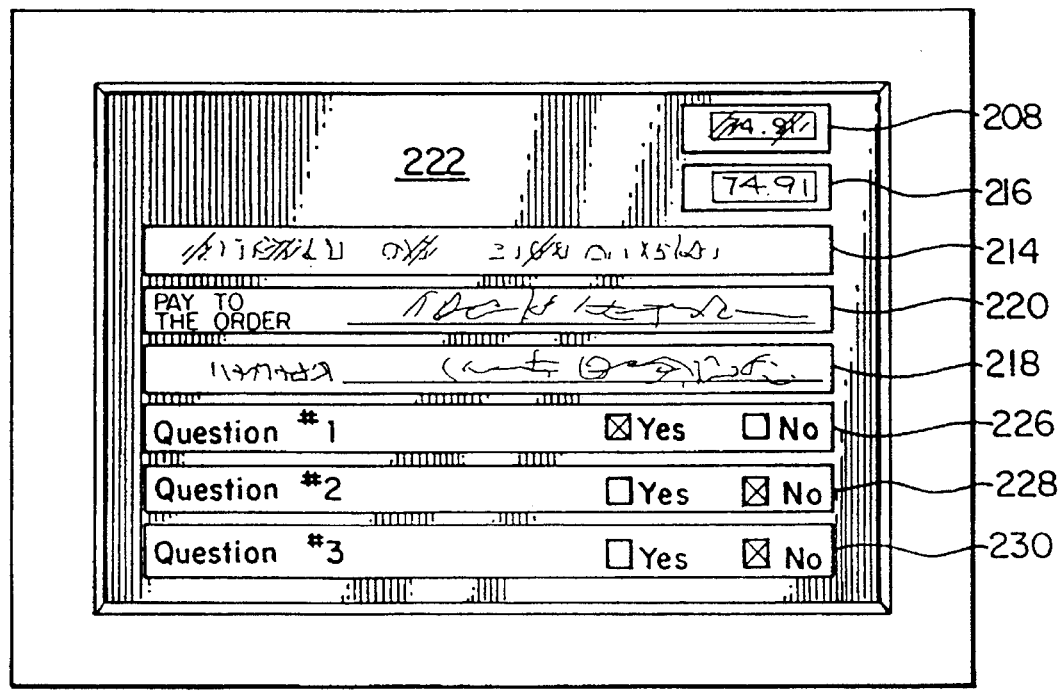
FIG. 12 is a sample display showing eight separate sections of the invoice stub and the check shown in FIG. 9.

Alternative configurations of images may be displayed on the video monitor 38 as shown in FIGS. 10–12. Referring to FIG. 10, an enlarged image of an amount due box 208 appearing on document 205 and an enlarged image of a courtesy amount box 216 appearing on document 206 are displayed on the monitor. The display shown in FIG. 10 results from moving the front camera 66 along slot 68 into closer proximity to the document position 24. The video control board 154 transfers a portion of image buffer 1 (162) containing a partial image of document 205 into display section 1 (172) and transfers a portion of image buffer 2 (164) containing a selected area of check 206 into display section 2 (174).

The display on the monitor depicted in FIG. 11 results from the acquisition of two separate front images of invoice 205 and one front image of check 206 by front camera 66. Image buffers 1 and 2 (162 and 164) contain separate portions of document 205 and image buffer 3 (166) contains a portion of check 206. The video control board 154 transfers the image buffers 1, 2, and 3 (162, 164, and 166) to display section 1, 2, and 3 (172, 174, and 176) resulting in the display shown in FIG. 11.

Referring to FIG. 12, the display of eight separate sections of display buffer 170 are shown. In achieving this display, a full image of the front of invoice 205 and the front of check 206 is acquired. In addition, an image of the back of invoice 205 is acquired. The amount due box 208 of invoice 205 and the courtesy amount box 216 of check 206 are loaded into display sections 1 and 2 (172 and 174), respectively. The OCR line 214 of the invoice 205 is loaded into display section 3 (176). The payee section 220 of check 206 is loaded into display section 4 (178). The signature area 218 of check 206 is loaded into display section 5 (180). In addition, three portions of the back of invoice 205 are displayed, designated as 226, 228, and 230, each such portion having been loaded into display sections 6, 7, and 8 (182, 184, and 186).

The operation of the document sorter 10, and, in particular, the configuration of the displays is a representative sample of the system flexibility. For example, the document sorter 10 may be used in various other configurations. For instance, the sorting of single documents, rather than document pairs, may be effected. In this configuration, an operator may designate the existence or absence of a particular characteristic on single documents. In an alternate configuration, a keyboard may be added to the system to allow the operator to add additional information, for example, a customer's new address.

In addition, the decision-making of an operator may be combined with a decision produced by the control system of the document sorter 10. For instance, the operator may be assigned the task of determining whether to designate a pair of documents as a full-pay or partial-pay using a manually actuatable selector. In such an instance, a display such as the one shown in FIG. 10 may be used. While the operator is making the full-pay/partial-pay determination, an address change detect module on video control board 154 may be utilized to automatically determine whether the customer has checked off an address change box on an invoice. The operator's decision and the decision of the video control board 154 can then be combined resulting in a designation of four groupings. For example, full-pays without address change may be directed to output bin 51, full-pays with address change may be directed to output bin 53, partial-pays without address change may be directed to output bin 55, and partial-pays with address change may be direct to output bin 57.

Furthermore, the document sorter 10 may be used in a continuous mode of operation. In such a mode, images of single documents or document pairs may be acquired and displayed on video monitor 38. The operator is required to actuate a selector button only when a pair of documents having a desired characteristic is displayed on the monitor 38. No selection needs to be made for documents lacking the desired characteristic. By way of example, it may be determined that the typical mix of documents in input bin 12 contains ninety percent full payments and ten percent partial payments. As such, the desired characteristic may be documents having a partial-payment. In the continuous mode of operation, documents are continuously conveyed through the document sorter 10. When the operator determines that a partial-pay is displayed on the video monitor 38, the operator actuates the selector and, in response, the documents are directed to the appropriate output area for partial-pay documents. The selector is not actuated, however, when a full-pay appears on the video monitor 38 and, in response, the full-pay documents are automatically directed to the appropriate output area for full-pay documents.

In yet another mode of operation of the document sorter 10, the optical scanner and display monitor may be excluded from the system. In such a configuration, documents 14 are conveyed from the input bin 12 directly to the viewing area 34. The operator may then inspect the documents by viewing them directly or viewing them through a magnifying lens. The operation of the push buttons and override button may function as previously described.

It will be recognized by those skilled in the art that changes or modifications may be made without departing from the broad inventive concepts of the invention. It should therefore be understood that this invention is not limited to the particular embodiments described herein, but is intended to include all changes and modifications that are within the scope and spirit of the invention as set forth in the Claims.

What is claimed is:

1. An apparatus for sorting documents comprising:
   (a) a document transport for conveying the documents along a selected path of movement;
   (b) a viewing area positioned along the selected path for presenting each of the documents to an operator for visual detection of documents having a desired characteristic;
   (c) a group selector for activation by the operator upon visual detection of documents having the desired characteristic while the documents are on the selected path;
   (d) an override selector for activation by the operator for overriding the activation of the group selector while the documents are on the selected path; and
   (e) a gate along the selected path responsive to the activation of the group selector by the operator for directing documents having the desired characteristic to a selected output area.

2. The apparatus of claim 1 comprising an override gate along the selected path responsive to the activation of the override selector for directing documents to a selection override output area.

3. The apparatus of claim 1 comprising a document input for feeding documents into the selected path of movement.

4. The apparatus of claim 3 wherein the document input comprises a document input bin.

5. The apparatus of claim 1 comprising an output bin at the selected output area for stacking documents having the desired characteristic.

6. An apparatus for sorting documents comprising:
   (a) a document transport for conveying the documents along a selected path of movement;
   (b) a viewing area positioned along the selected path for presenting each of the documents to an operator for visual detection of documents having a desired characteristic;
   (c) a group selector for activation by the operator upon visual detection of documents having the desired characteristic while the documents are on the selected path;
   (d) a staging area positioned along the selected path, wherein the document transport conveys the documents from the viewing area to the staging area upon activation of the group selector and temporarily pauses the documents in the staging area to allow the operator to redirect the documents; and
   (e) a gate along the selected path responsive to the activation of the group selector by the operator for directing documents having the desired characteristic to a selected output area.

7. An apparatus for sorting pairs of documents comprising:
   (a) a document transport for conveying the pairs of documents along a selected path of movement;
   (b) a viewing area positioned along the selected path for presenting each pair of documents to an operator for visual detection of pairs of documents having a desired characteristic;
   (c) a manual selector for activation by the operator upon visual detection of pairs of documents having the desired characteristic while the pairs of documents are on the selected path;
   (d) a gate along the selected path responsive to the activation of the manual selector by the operator for directing pairs of documents having the desired characteristic to a first selected output area and for directing pairs of documents lacking the desired characteristic to a second selected output area;
   (e) an override button for activation by the operator for overriding the activation of the manual selector while the pairs of documents are on the selected path; and (f) an override gate positioned along the selected path responsive to the activation of the override button for directing documents having the desired characteristic to the first selected output area and for directing documents lacking the desired characteristic to the second selected output area.

8. An apparatus for sorting documents comprising:

(a) a document transport for conveying the documents along a selected path of movement;

(b) a viewing area positioned along the selected path for presenting each of the documents to an operator for visual detection of documents having a desired characteristic;

(c) a manual selector for activation by the operator upon visual detection of documents having the desired characteristic while the documents are on the selected path, wherein the document transport conveys documents to a first selected area in response to activation of the selector and the document transport automatically conveys documents to a second selected area in response to the absence of activation of the selector; and (d) a gate along the selected path, wherein the gate has a first position for directing documents having the desired characteristic to the first selected output area responsive to the activation of the selector by the operator and wherein the gate has a second position for directing documents lacking the desired characteristic to the second selected output area responsive to the absence of the activation of the selector by the operator.

9. An apparatus for sorting pairs of documents comprising;

(a) a document transport for conveying the pairs of documents along a selected path of movement;

(b) a viewing area positioned along the selected path for presenting each pair of documents to an operator for visual detection of pairs of documents having a desired characteristic;

(c) a manual selector for activation by the operator upon visual detection of pairs of documents having the desired characteristic while the pairs of documents are on the selected path;

(d) gate along the selected path responsive to the activation of the manual selector by the operator for directing pairs of documents having the desired characteristic to a first selected output area and for directing pairs of documents lacking the desired characteristic to a second selected output area; and (e) an override button for activation by the operator for overriding the activation of the manual selector.

10. An apparatus for sorting pairs of documents comprising:

(a) a document transport for conveying at least a pair of documents along a selected path of movement;

(b) anioptical scanner positioned along the selected path for capturing an image of at least one selected area from each document of the pair of documents;

(c) a display monitor for simultaneously displaying the captured images of the pair of documents;

(d) display monitor control for causing the display monitor to simultaneously display the selected area from each document of the pair of documents for simultaneous visual inspection of the selected areas of the pair of documents by an operator to permit detection of a desired characteristic on the pair of documents by the operator;

(e) a selector for activation by the operator upon visual detection of the desired characteristic on the pair of documents; and (f) a gate along the selected path responsive to the activation of the selector by the operator for directing the pair of documents having the desired characteristic to a selected output area.

11. The apparatus of claim 10 wherein the optical scanner includes capturing means for capturing a plurality of images of the pair of documents and wherein the display monitor simultaneously displays the plurality of images of the pair of documents for visual inspection by the operator to permit detection of a desired characteristic on the pair of documents by the operator.

12. The apparatus of claim 10 wherein the gate has a first position for directing pairs of documents having the desired characteristic to a first selected output area responsive to the activation of the selector by the operator and wherein the gate has a second position for directing pairs of documents lacking the desired characteristic to a second selected output area responsive to the absence of the activation of the selector by the operator.

13. The apparatus of claim 10 comprising pausing means for pausing the movement of the pair of documents along the selected path to permit the visual inspection of the pair of documents by the operator.

14. The apparatus of claim 13 comprising a viewing area located along the selected path for visual examination of the pair of documents and wherein the pausing means pauses the movement of the pair of documents at the viewing area to permit the visual examination of the pair of documents at the viewing area by the operator.

15. The apparatus of claim 14 comprising a staging area positioned along the selected path where movement of the pair of documents is temporarily stopped and an override switch for activation by the operator while the pair of documents is positioned in the staging area to cancel the activation of the selector.

16. An apparatus for sorting pairs of documents comprising:

(a) a document transport for conveying at least a pair of documents along a selected path of movement;

(b) an optical scanner positioned along the selected path wherein the optical scanner includes capturing means for capturing a plurality of images of selected areas on the pair of documents;

(c) a display monitor for simultaneously displaying the images of the selected areas of the pair of documents for visual inspection by an operator to permit detection of a desired characteristic on the pair of documents by the operator;

(d) a selector for activation by the operator upon visual detection of the desired characteristic on the pair of documents;

(e) a gate along the selected path responsive to the activation of the selector by the operator for directing the pair of documents having the desired characteristic to a selected output area; and (f) enlarging means for enlarging the images of selected areas on the pair of documents and wherein the display monitor simultaneously displays the enlarged images of the selected areas of the pair of documents for visual inspection by the operator to permit detection of a desired characteristic on the pair of documents by the operator.

17. An apparatus for sorting pairs of documents comprising:

(a) a document feeder for holding the pairs of documents and for feeding each pair of documents from the document feeder;

(b) a document transport for conveying the pair documents from the document feeder along a selected path of movement;

(c) an optical scanner positioned along the selected path at an imaging area for capturing images of selected areas on the pair of documents;

(d) a display monitor for displaying the captured images of the pair of documents to permit visual inspection of the captured images of the pairs of documents to enable detection of a desired characteristic on the pair of documents by an operator;

(e) a viewing area positioned along the selected path for holding the pair of documents to permit visual inspection of the actual pair of documents by the operator;

(f) a manual selector for activation by the operator in response to visual detection of the desired characteristic on the pair of documents and in response to visual detection of an absence of the desired characteristic on the pair of documents;

(g) a staging area positioned along the selected path for holding documents conveyed by the document transport from the viewing area in response to the activation of the manual selector by the operator;

(h) an override switch for activation by the operator while the pair of documents are held in the staging area for overriding the activation of the manual selector by the operator; and (i) a gate responsive to the manual selector and the override switch for directing a pair of documents having the desired characteristic to a first selected output area and for directing a pair of documents lacking the desired characteristic to a second selected output area.

18. A method for sorting documents comprising:

(a) conveying the documents along a selected path of movement;

(b) optically imaging the documents conveyed along the selected path of movement;

(c) displaying images of the documents to permit visual inspection of the images by an operator to permit detection of a desired characteristic on the documents;

(d) activating a selector upon visual detection of the desired characteristic on the documents;

(e) pausing the documents at a staging area along the selected path of movement to permit the operator to redirect the documents along the selected path of movement; and (f) directing documents having the desired characteristic to a first selected output area.

19. The method as recited in claim 18 including pausing the document at a viewing area located along the selected path of movement to permit visual examination of the actual documents at the viewing area.

20. The method recited in claim 18 including detecting the activation of an override switch for directing documents paused at the staging area to a second selected output area.

21. An apparatus for sorting documents comprising:

(a) a document transport for conveying documents along a selected path of movement;

(b) a viewing area positioned along the selected path for presenting the documents to an operator for visual detection of documents having a desired characteristic;

(c) a manual selector for activation by the operator upon visual detection of the documents having the desired characteristic while the documents are on the selected path;

(d) a gate along the selected path responsive to the activation of the manual selector by the operator for directing the documents having the desired characteristic to a selected output area and for directing documents lacking the desired characteristic to a second output area;

(e) an override button for activation by the operator for overriding the activation of the manual selector; and (f) an override gate positioned along the selected path responsive to the activation of the selector by the operator for directing the documents having the desired characteristic to the selected output area and for directing documents lacking the desired characteristic to the second output area.

22. An apparatus for sorting documents comprising:

(a) a document transport for conveying documents along a selected path of movement;

(b) an optical scanner positioned along the selected path wherein the optical scanner includes capturing means for capturing a plurality of images of selected areas on the documents;

(c) a display monitor for displaying the plurality of images of the selected areas of the documents for visual inspection by an operator to permit detection of a desired characteristic on the documents by the operator;

(d) a selector for activation by the operator upon visual detection of the desired characteristic on the documents, wherein the document transport conveys documents to a first selected area in response to activation of the selector and the document transport automatically conveys documents to a second selected area in response to the absence of activation of the selector; and (e) a gate along the selected path, wherein the gate has a first position for directing documents having the desired characteristic to the first selected output area responsive to the activation of the selector by the operator and wherein the gate has a second position for directing documents lacking the desired characteristic to the second selected output area responsive to the absence of the activation of the selector by the operator.

23. An apparatus for sorting documents comprising:

(a) a document transport for conveying documents along a selected path of movement;

(b) an optical scanner positioned along the selected path wherein the optical scanner includes capturing means for capturing a plurality of images of selected areas on the documents;

(c) a display monitor for displaying the plurality of images of the selected areas of the documents for visual inspection by an operator to permit detection of a desired characteristic on the documents by the operator;

(d) a selector for activation by the operator upon visual detection of the desired characteristic on the documents;

(e) a gate along the selected path responsive to the activation of the selector by the operator for directing the documents having the desired characteristic to a selected output area; and (f) enlarging means for enlarging the images of selected areas on the documents and wherein the display monitor displays the enlarged images of the selected areas of the documents.

24. An apparatus for sorting documents comprising:
(a) a document transport for conveying documents along a selected path of movement;
(b) an optical scanner positioned along the selected path wherein the optical scanner includes capturing means for capturing an image of the documents;
(c) enlarging means for enlarging the images of the documents;
(d) a display monitor for displaying the enlarged images of the documents for visual inspection by an operator to permit detection of a desired characteristic on the documents by the operator;
(e) a group selector for activation by the operator upon visual detection of the desired characteristic on the documents; and
(f) a gate along the selected path responsive to the activation of the selector by the operator for directing the documents having the desired characteristic to a selected output area.

25. An apparatus for sorting documents comprising:
(a) a document transport for conveying the documents along a selected path of movement;
(b) an optical scanner positioned along the selected path for capturing an image of the documents;
(c) a display monitor for displaying the captured image of the documents for visual inspection of the documents by an operator to permit detection of a desired characteristic on the pair of documents by the operator;
(d) a group selector for activation by the operator upon visual detection of documents having the desired characteristic while the documents are on the selected path;
(e) an override selector for activation by the operator for overriding the activation of the group selector while the documents are on the selected path; and
(f) a gate along the selected path responsive to the activation of the group selector by the operator for directing documents having the desired characteristic to a selected output area.

26. An apparatus for sorting documents comprising:
(a) a document transport for conveying the documents along a selected path of movement;
(b) an optical scanner positioned along the selected path for capturing an image of the documents;
(c) a display monitor for displaying the captured image of the documents for visual inspection of the documents by an operator to permit detection of a desired characteristic on the pair of documents by the operator;
(d) a group selector for activation by the operator upon visual detection of documents having the desired characteristic while the documents are on the selected path;
(e) a staging area positioned along the selected path, wherein the document transport conveys the documents from the viewing area to the staging area upon activation of the group selector and temporarily pauses the documents in the staging area to allow the operator to redirect the documents; and
(f) a gate along the selected path responsive to the activation of the group selector by the operator for directing documents having the desired characteristic to a selected output area.

27. The apparatus of claim 1, 6, 22, 24, 25, or 26 wherein the gate has a first position for directing documents having the desired characteristic to a first selected output area responsive to the activation of the group selector by the operator and wherein the gate has a second position for directing documents lacking the desired characteristic to a second selected output area responsive to the absence of the activation of the group selector by the operator.

28. An apparatus for sorting documents comprising:
(a) a document transport for conveying documents along a selected path of movement;
(b) an optical scanner positioned along the selected path for capturing an image of the documents;
(c) a display monitor for displaying the captured image of the documents for visual inspection of the documents by an operator to permit detection of a desired characteristic on the pair of documents by the operator;
(d) a manual selector for activation by the operator upon visual detection of the documents having the desired characteristic while the documents are on the selected path;
(e) a gate along the selected path responsive to the activation of the manual selector by the operator for directing the documents having the desired characteristic to a selected output area and for directing documents lacking the desired characteristic to a second output area;
(f) an override button for activation by the operator for overriding the activation of the manual selector; and
(g) an override gate positioned along the selected path responsive to the activation of the selector by the operator for directing the documents having the desired characteristic to the selected output area and for directing documents lacking the desired characteristic to the second output area.

* * * * *